United States Patent [19]
Gregoire et al.

[11] Patent Number: 5,549,795
[45] Date of Patent: Aug. 27, 1996

[54] CORONA SOURCE FOR PRODUCING CORONA DISCHARGE AND FLUID WASTE TREATMENT WITH CORONA DISCHARGE

[75] Inventors: Daniel J. Gregoire; Robin J. Harvey, both of Thousand Oaks; Franklin A. Dolezal, Reseda; Weldon S. Williamson, Malibu, all of Calif.

[73] Assignee: Hughes Aircraft Company, Los Angeles, Calif.

[21] Appl. No.: 295,959

[22] Filed: Aug. 25, 1994

[51] Int. Cl.$^6$ ........................................ H05F 3/00
[52] U.S. Cl. ................ 204/164; 204/168; 204/169; 588/210; 588/212; 427/569
[58] Field of Search ........................... 204/164, 168, 204/169; 588/210, 212; 427/569

[56] References Cited

U.S. PATENT DOCUMENTS

| Re. 30,320 | 1/1980 | Lowther | 204/176 |
|---|---|---|---|
| 3,675,096 | 7/1972 | Kiess | 317/262 A |
| 4,130,490 | 12/1978 | Flamm et al. | 250/531 |
| 4,650,555 | 3/1987 | Rzad et al. | 204/174 |
| 4,918,031 | 4/1990 | Flamm et al. | 204/192.32 |
| 4,924,092 | 5/1990 | Crist | 250/324 |
| 5,078,823 | 1/1992 | Chollet et al. | 204/298.38 |
| 5,147,423 | 9/1992 | Richards | 55/129 |
| 5,160,510 | 11/1992 | Steinbacher et al. | 55/7 |
| 5,190,037 | 3/1993 | Di Mino et al. | 128/422 |
| 5,236,672 | 8/1993 | Nunez et al. | 422/186.04 |
| 5,317,155 | 5/1994 | King | 250/326 |
| 5,361,737 | 11/1984 | Smith, et al. | 123/143 B |

FOREIGN PATENT DOCUMENTS

| 1311711 | 5/1987 | U.S.S.R. . |
|---|---|---|

OTHER PUBLICATIONS

Nunez et al. "Corona Destruction: an Innovative Control Technology for VOCs and Air Toxics", Air & Waste, vol. 43, Feb. 1993, pp. 242–247.

Yamamoto et al.,"Control of Volatile Organic Compounds by an AC Energized Ferroelectric Pellet Reactor and a Pulsed Corona Reactor", *Industry Applications Society Annual Meeting 1989*, vol. 2, pp. 2175–2179.

W. J. Cooper et al.,"Treatment of Industrial Hazardous Wastes With High Energy Electrons", presented to Hazardous Materials Control Research Institute's 7th Nat. RCRA/Superfund Conf., May 2–3, 1990, St.Louis, MO, pp. 1–15.

Bonnazza et al.,"RF Plasma Ignitions System Concept for Lean Burn Internal Combustion Engines" *Society of Automotive Engineers*, Paper No. 929416, 1992, pp. 4.315–4.319.

Mishra et al.,"Effect of Plasma and Dielectric Loading on the Slow–Wave Properties of a Travelling Wave Tube", *IEEE Transactions on Electronic Devices*, vol.37, No.6 Jun. 1990, pp. 1561–1565.

*Primary Examiner*—John Niebling
*Assistant Examiner*—Kishor Mayekar
*Attorney, Agent, or Firm*—V. D. Duraiswamy; W. K. Denson-Low

[57] ABSTRACT

A corona source suitable for use in vehicle ignition systems uses a conductive coil that receives an RF input at one end and has a corona discharge site at the other end, with a reference electrode capacitively coupled to the coil. The pitch and the length of the coil are selected to produce a corona discharge in response to an RF input signal at a predetermined frequency and voltage, through quarter wavelength resonation. Either the new resonant coil or other corona discharge devices can be used to remediate fluid-borne wastes by initiating and sustaining RF corona discharges within the fluid. The pulses used to initiate the corona discharge preferably have alternating positive and negative components, with high initial voltages on the positive components to initiate the discharge, followed by lower positive voltage levels to sustain the discharge. Unipolar pulses, preferably with progressively decreasing voltage levels, can also be used.

16 Claims, 4 Drawing Sheets

CORONA SOURCE FOR PRODUCING CORONA DISCHARGE AND FLUID WASTE TREATMENT WITH CORONA DISCHARGE

BACKGROUND OF THE INVENTION

1. Field of the Invention

This invention relates to the treatment of liquid and gaseous wastes, and more particularly to the treatment of hydrocarbon waste materials in a fluid through a corona discharge, and the generation of a corona discharge with a radio frequency (RF) operated helical coil quarter-wave resonator.

2. Description of the Related Art

Corona scrubbers have been used to activate chemical reactions that break down pollutants in a gas discharge. Such systems, which are described for example in Nunez et al. "Corona Destruction: an Innovative Control Technology for VOCs and Air Toxics", *Air & Waste*, Vol. 43, February 1993, pages 242–247 and Yamamoto et al., "Control of Volatile Organic Compounds by an AC Energized Ferroelectric Pellet Reactor and a Pulsed Corona Reactor", *Industry Applications Society Annual Meeting* 1989, Vol. 2, pages 2175–2179, employ relatively low frequency energizing signals to produce a corona discharge. Energizing frequencies that have been used generally range from the standard line frequency of 60 hz up to about 200 Hz. Unfortunately, this corona discharge technique has not been found to be applicable for the treatment of waste products contained in a liquid.

In the field of liquid waste treatment, chlorination is commonly used for potable water and sewage. However, it has serious disadvantages in terms of safety, handling complexity, and the generation of undesirable chlorinated hydrocarbons as byproducts; other chemical treatments have similar drawbacks. Another approach uses ultraviolet (UV) excitation to destroy biologically active viral and bacterial agents remnant in sewage. However, UV has not been shown to be of utility in the decontamination of industrial or sewage waste requiring the removal of destruction of carcinogenic or toxic compounds. Thermal treatments, such as distillation, have also been investigated but are very expensive.

Another area of investigation is the treatment of contaminated wastewater with electron beams. This type of treatment has been demonstrated using a 1.5-MeV electron beam scanned across a thin sheet of flowing water, as described in W. J. Cooper, et al. "Treatment of Industrial Hazardous Wastes With High Energy Electrons", presented to Hazardous Materials Control Research Institute's 7th National RCRA/Superfund Conference, May 2–3, 1990, St. Louis, Mo., pages 1–15. The technique has been shown to be effective against chlorinated hydrocarbons and many other organic contaminates, which are reduced or oxidized to inert compounds by the action of free radicals and free electrons induced as secondaries within the water by the beam. High energy electrons deposit energy into the water by bremsstrahlung radiation, which creates low energy ionizing x-rays, and by ionizing collisions. The exact chemical processes are complex, but they are believed to lead to the formation of a variety of reactive species within the water, in particular to free thermal electrons and to OH radicals, that are highly reactive.

Electron beam treatment has required a high beam energy to obtain a suitable penetration depth. This in turn involves a high cost to shield x-rays and to erect the structure. At lower electron beam energies, in the 100–150 keV range, the power supply and electron gun become of more manageable size and the x-ray hazard becomes manageable. However, beam losses in the window that protects the electron gun vacuum become serious below 150 kV, with the robustness of the window vanishing below about 100 kV if it is designed to be thin enough to efficiently transmit electrons. In addition to the window injury, the low beam energy results in a penetration depth that is very short and requires exotic capillary fluid flow apparatus (with high viscous flow losses) to ensure that the fluid cross section is thin enough to be successfully irradiated. Furthermore, there is a serious foil-heating problem that arises with high duty use.

In addition to the gas scrubbing application mentioned above, corona discharge devices have been developed which have other potential environmental uses. For example, conventional spark plugs used in internal combustion engines typically deliver energies of about 20–30 mJ per pulse. If a higher energy ignition system could be developed, it would offer several advantages. First, with current systems not all of the burned gas is ejected from the cylinder during idle, resulting in a rough idle; increased idle stability could be achieved with a higher energy ignition. Second, higher fuel economies are available through exhaust gas recirculation (EGR) systems. With a spark energy of about 75 mJ, the EGR can be increased to its optimum level, and the gas mileage improved on the order of 1 MPG. In addition, NOx emissions would be reduced. Third, a higher energy spark would allow the fuel mixture at startup to be run leaner. Since most hydrocarbon emissions occur at startup, a significant drop in hydrocarbon emissions could be expected. Unburned fuel in the exhaust manifold, particularly when the catalytic converter is cold, is also an environmental problem that can be addressed by an efficient corona discharge.

One corona discharge device that is of interest is described in Bonnazza et al., "RF Plasma Ignitions System Concept for Lean Burn Internal Combustion Engines", *Society of Automotive Engineers*, Paper No. 929416, 1992, pages 4.315–4.319. It uses a co-axial, quarter-wave resonator with a solid inner conductor surrounded by an outer conductive cylinder. The outer cylinder is grounded, while a high frequency RF signal, in the hundreds of megahertz range, is applied to the inner conductor. The apparatus extends for one-quarter the length of the excitation wavelength, resulting in a co-axial cavity resonator with a maximum voltage at the opposite end of the device from where the RF input is applied. This produces a step-up transformation of the voltage at the opposite end of the device when resonance occurs.

The article reports the testing of a model, approximately 38 cm long, with a 200 MHz input signal that was applied through a rectangular loop feed. While successful ignitions were observed, the 38 cm length of the device was much longer than what is practical for a vehicle ignition system.

SUMMARY OF THE INVENTION

The present invention seeks to provide an improved liquid waste treatment technique that avoids the drawbacks of chemical treatment, has a wider range of application than UV treatment, is less expensive than thermal treatment, and is operable at lower energy levels than electron beam treatment systems. This is accomplished with an RF corona discharge system. In a related vein, the invention further seeks to provide an improved RF corona discharge mechanism that can be used for both liquid waste and exhaust gas treatment and in vehicle ignition systems, and is substantially smaller than previous devices.

Liquid waste treatment, or other chemical reactions, are achieved with the invention by initiating an RF corona discharge within a liquid, and sustaining the discharge at a level and for a duration sufficient to induce the desired chemical reaction, such as breaking down hydrocarbon waste materials. In the preferred embodiment, RF actuating pulses are applied to a corona discharge electrode within the liquid. An efficient operation is achieved by providing the pulses with alternating positive and negative components to initiate a corona discharge at a high potential, and then draw corona energy out from the fluid before arcing occurs. Various pulse forms can be used, such as positive pulse components that have high initial voltages to initiate the corona discharge followed by lower voltages to sustain the discharge, pulses at a single RF frequency, and pulses formed from a range of signals at different RF frequencies that are superimposed to provide the pulses with non-sinusoidal shapes. Unipolar pulses can also be used, in which case efficiency is enhanced by spacing the pulses close enough together so that their peak voltages can be progressively reduced. A corona discharge site is provided that establishes an electric field greater than about 30 to 100 kV/cm with an applied voltage of less than about 50 kV; this is sufficient to initiate the desired corona discharge.

The invention also provides a new quarter-wavelength RF excited resonant corona source that uses a length contracted center conductor, preferably a helical coil. This allows for the production of corona discharges with a device having an axial length that is significantly shorter than what has previously been achievable. The new corona source is applicable to vehicle ignition and remediation systems, gaseous and liquid waste treatment and other uses.

These and other features and advantages of the invention will be apparent to those skilled in the art from the following detailed description, taken together with the accompanying drawings.

DETAILED DESCRIPTION OF THE INVENTION

Figure 1:
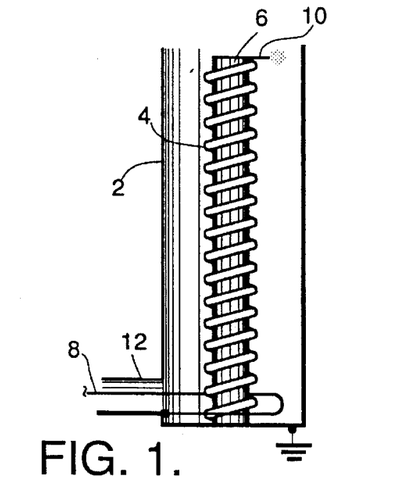
FIG. 1 is a sectional view of a corona source in accordance with the invention.

A novel corona source in accordance with the invention is shown in FIG. 1. It consists of a coaxial quarter-wavelength resonator that has an outer conductive cylindrical shield 2, preferably metal, and a length contracted inner conductive helically coiled wire 4 that is preferably wrapped around a dielectric core 6. The shield 2 serves as a reference electrode that is capacitively coupled to the coil 4. If enough stray capacitance between the coil and ground is present, the device will operate even without the outer conductor 2.

An RF signal is applied to the corona source over an input line 8, which makes a loop around the lower end of the coil 4 and is then connected to the lower end of the grounded shield 2. In this manner the lower ends of both the coil and shield are held at ground potential, while the RF input feed 8 functions as a resonant coupler. The coil functions simultaneously as a resonant circuit and as a single turn transformer winding, thereby inducing a stepped up voltage in the multi-turn coil that is peaked at the electrode end.

Figure 2:
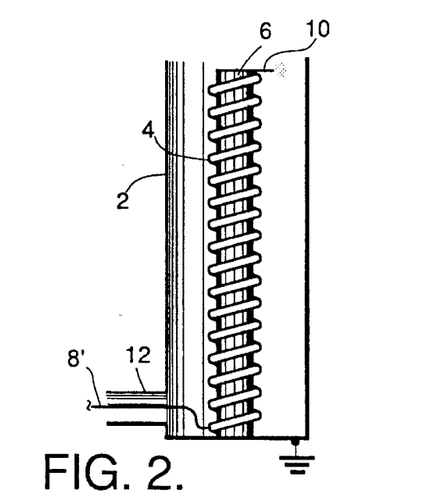
FIG. 2 is a sectional view of a corona source similar to that shown in FIG. 1, but with an RF feed that is connected directly to the source coil rather than through a transformer loop.

In one embodiment, the upper end of the coil is provided with an outward extending electrode 10 that has a sharp tip which functions as a corona discharge site, acting as a focal point for a field enhancement that leads to corona formation. The electrode may have a single discharge point as shown in FIG. 2, or it can be shaped more generally to produce a desired corona distribution or be fit into a sparkplug with either a monopolar discharge or a more conventional spark gas discharge, as shown in FIG. 1.

RF energy is delivered to the corona source via a coaxial feedthrough 12 and the power feed loop at the grounded end of the cavity. If the cavity were extended into an infinite transmission line, the RF feed signal would propagate along the line with an axial phase velocity that is a function of the relative diameters of the coil 4 and shield 2, and of the helix pitch. In general, the phase velocity decreases as the helix pitch angle decreases. Calculation of the phase velocity is difficult, and is discussed in the literature on traveling wavetubes, such as Mishra et al., "Effect of Plasma and Dielectric Loading on the Slow-Wave Properties of a Traveling Wave Tube", *IEEE Transactions on Electronic Devices*, Vol. 37, No. 6, June 1990, pages 1561–1565. However, an estimate of the phase velocity can be obtained by considering the limiting case in which the reference electrode shield 2 is located close to the coil 4. In this limit, the RF axial phase velocity $v_p$ is given by:

$$v_p = c \sin \phi$$

where c is the speed of light in vacuum and $\phi$ is the helix pitch angle.

For a given geometric configuration, there is a frequency $f_o$ at which RF resonance will occur along the coil 4. The resonant frequency $f_o$ is determined in the corona source by the boundary conditions at the opposite ends of the coil, the resonator length L and the phase velocity $v_p$ along the resonator:

$$f_o=(2n+1)v_p/4L, \; n=0,1,2,\ldots$$

The lowest resonant frequency occurs when n=0 and the resonator's length is equal to ¼ of the RF wavelength.

Since the potential difference between the coil 4 and outer shield 2 is zero at the grounded end and a maximum at the opposite end, there is a voltage gain between these two extremities. The absolute voltage difference obtained at the corona discharge end is determined by the feed loop's coupling efficiency, the input power and the resonator Q, which in turn is dependent upon the materials' electrical properties, the drive frequency, and the cavity feed loop and electrode geometries.

Instead of providing the RF input as a single turn transformer loop 8, the RF input line can be connected directly to the coil. This is illustrated in FIG. 2, in which the input line 8' is connected to the near lower end of the coil, which in turn is connected to the bottom of the grounded electrode shield 2. This version, however, does not provide for the transformer isolation that is inherent in the design of FIG. 1.

Figure 3:
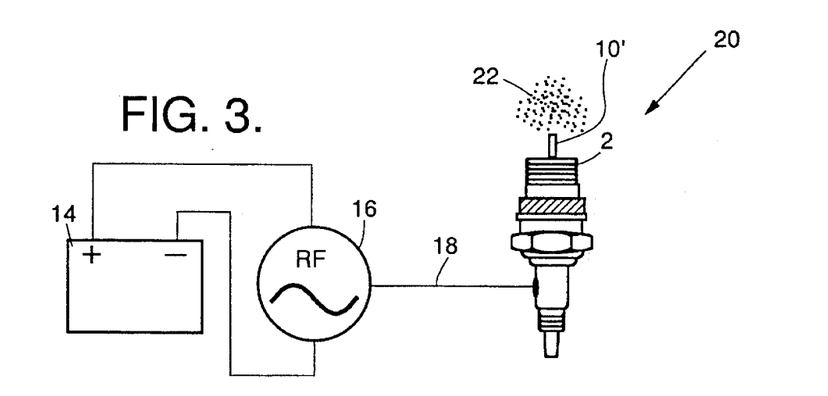
FIG. 3 is a block diagram of the new corona source configuration used in a vehicle ignition application.

FIG. 3 illustrates the application of the resonator coil corona source to a vehicle ignition application. The vehicle battery 14 is connected to energize an RF oscillator 16. The oscillator output is applied over an output line 18 to a spark plug implemented as a resonator coil corona source 20 as described above. In this case, however, the corona tip 10' is turned upward so that a corona 22 is produced above the outer electrode. In the preparation for this set up, the RF source 16 would preferably be tuned to the corona source's resonant frequency by sweeping the source's frequency until the reflected power from the resonator is minimized. Phase adjusters could also be added to provide for impedance matching, tuning the phase adjusters until the reflector power is again minimized.

In the automotive application, the engine timing requires proper synchronization of the spark. It is possible to use a number of corona spark plugs, each powered by a separate RF power supply to assure proper timing. Alternately, one may use a single RF power supply and RF switches to select each plug in sequence. However, a much more cost effective means is to use a common tunable RF power supply in combination with a number of corona spark plugs, with each plug tuned to a different resonant frequency. The RF supply is repetitively pulsed at the ignition repetition rate and swept in frequency. Each pulse of the output frequency matches to the correct spark plug at the time required by the engine timing sequence. In this manner, a number of spark plugs can be operated with a common transmission line. Plugs that are not in the resonant range do not draw power.

Figure 4:
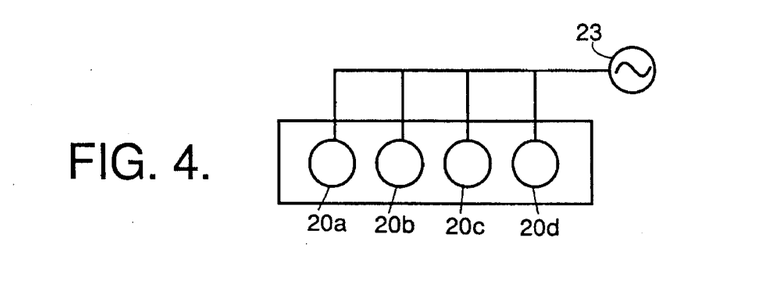
FIG. 4 is a simplified plan view of a corona spark plug array energized by a frequency sweeping RF power supply.
Figure 5:
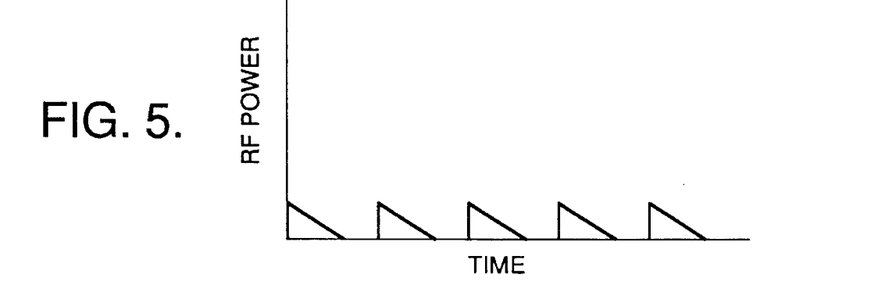
FIGS. 5 and 6 are diagrams illustrating a frequency-swept energization pattern that can be applied to the spark plug array of FIG. 4.
Figure 6:
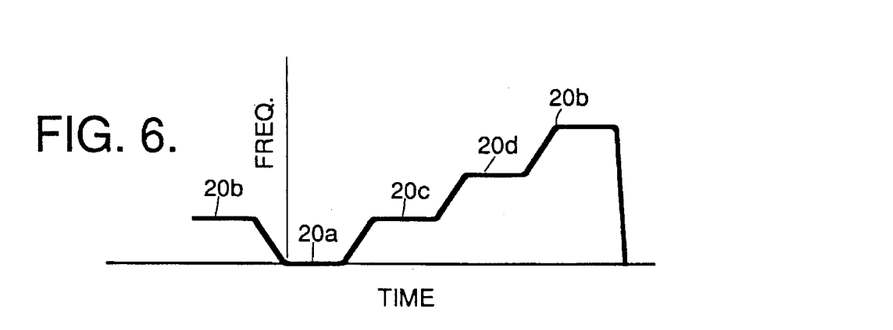

FIG. 4 illustrates a series of spark plugs 20a–20d supplied from a frequency-sweeping RF power supply 23 in this manner. FIGS. 5 and 6 illustrate the frequency sweeping, with the frequency for each spark plug identified by the plug's reference number 20a–20d.

In an implementation of the invention, a resonator length of 11.6 cm was employed, with an outer reference electrode diameter of 3.8 cm and a helical coil diameter of 0.6 cm. The helix pitch was 0.25 cm, with a pitch angle of 5.2°. An RF feed loop as illustrated in FIG. 1 was used; the loop diameter was 1.57 cm, offset from the bottom of the resonator by 0.3 cm. The wire size employed in the helical coil was 0.05 cm. Corona was first observed at 77 MHz with 5 W of net input power. The corona ignited spontaneously, and was approximately 0.5 cm in diameter.

The corona may be arranged to be localized at one point, or to fill a gap between electrodes. The corona is found to be chemically active, as though it were a flame. It is capable of fusing plastics, or igniting flammable materials.

Another aspect of the invention involves the use of this type of RF corona source, or other RF corona sources, for the treatment of liquid wastes. Previously, corona has been observed in a liquid in conjunction with water discharge devices used as high voltage switches. In these devices, a water-filled gap is charged with a pulse that exceeds the gap's normal breakdown voltage, producing a corona discharge that rapidly results in an arc across the gap. The idea is to transition from corona to an arc as rapidly as possible.

With the present invention, on the other hand, it has been discovered that hydrocarbon waste material in a liquid can be broken down by the application of a sustained corona discharge within the liquid. The process involved is believed to be similar to that postulated for the use of electron beams in liquid waste treatment. Specifically, the principle treatment process is believed to stem from emitted electrons hitting water molecules to form OH radicals, which are highly reactive. The radicals diffuse through the liquid, reacting with and breaking down organic molecules. When an OH radical hits a hydrogen atom on a hydrocarbon molecule, water is produced. When the radical hits a carbon atom on the molecule, carbon monoxide is produced and then converted to carbon dioxide upon being hit by another radical.

A corona is present in a medium when the medium is exposed to a flux of non-thermal electrons with sufficient energy to excite high level transitions and ionization events, characteristically producing a visible diffuse glow. Generally, a corona is time dependent and can pass through noisy growth and decay phases, or may transition into an arc. On a microscopic scale, a corona pattern is similar to a fractal, with filamentary ionization paths propagating outward into a volume. These filaments are referred to as streamers and brushes, depending upon their shape and polarity. Visually, the geometry of a streamer in an insulating fluid is similar to that in a solid. Although the damage pattern in a solid is generally permanent, a gas or liquid generally recovers its dielectric properties after a pulse.

For this reason, the corona activated region can be repetitively pulsed in a liquid. The activated region can be made to grow statistically from pulse to pulse, thereby involving a large fraction of the liquid volume. On a repetitive basis, the pattern statistically covers all of the liquid a certain distance away from the electrode. This distance depends upon the field, the pulse waveform and the liquid characteristics. Activation of all of the fluid can be assisted with the use of a turbulent flow, or by reversing polarity.

Figure 7:
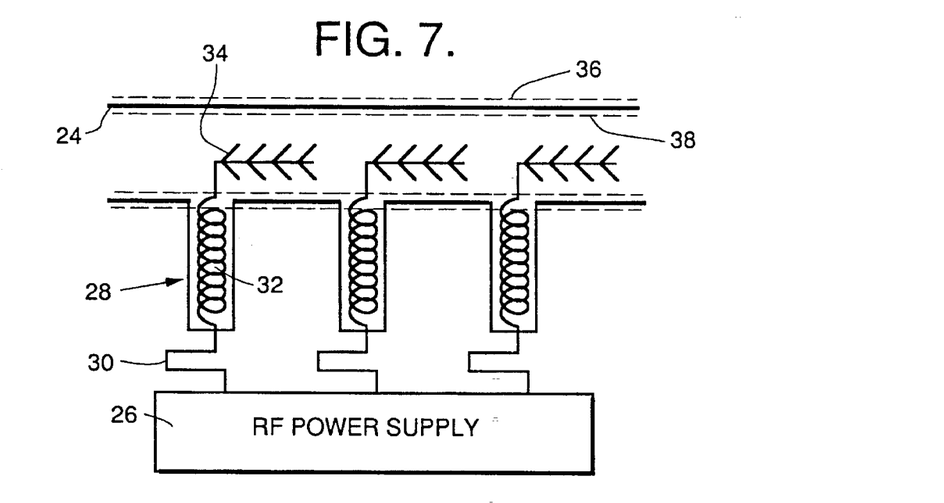
FIG. 7 is a simplified diagram of a liquid waste treatment system using RF corona discharge sources similar to those shown in FIG. 1.

FIG. 7 shows a simplified system in which quarter-wave resonant corona sources of the type described above are used to induce a corona discharge in a flowing liquid to treat organic wastes contained in the liquid. The liquid flows through a dielectric tube 24 such as glass. An RF power supply 26 provides RF signals, with a frequency on the order of about fifty to several hundred MHz, to a series of resonators 28 through respective tuning stubs 30. The helical coil 32 within each resonator is brought out into the center of the liquid flow path through the tube 24, where it extends along the tube axis with a series of projecting tines 34 which provide corona discharge sites at their outer tips. A reference electrode can be stationed either outside and surrounding the tube, as indicated by dashed line 36, or as an elongated cylinder within the tube as indicated by dashed line 38; positioning it outside the tube is generally preferred in order to eliminate bipolar arcs to electrode 38 and also to avoid disrupting the liquid flow and restricting the effective flow passageway.

Figure 8:
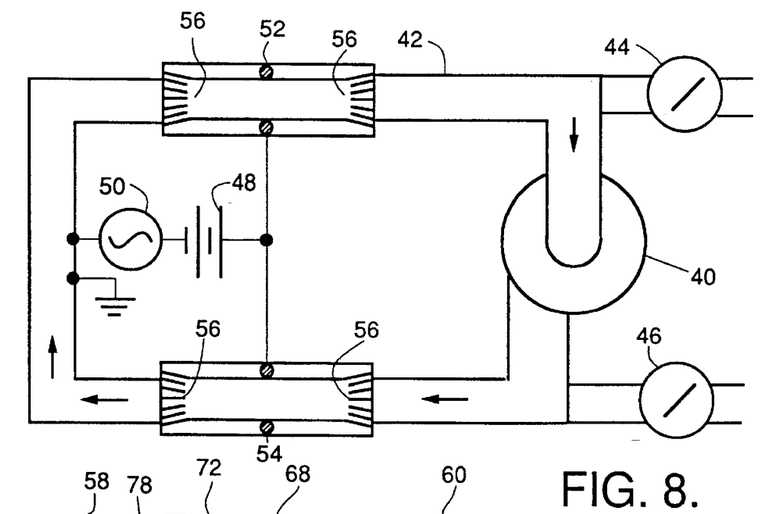
FIG. 8 is a simplified diagram of a closed liquid waste treatment system in accordance with the invention, using another type of corona discharge mechanism.
Figure 9:
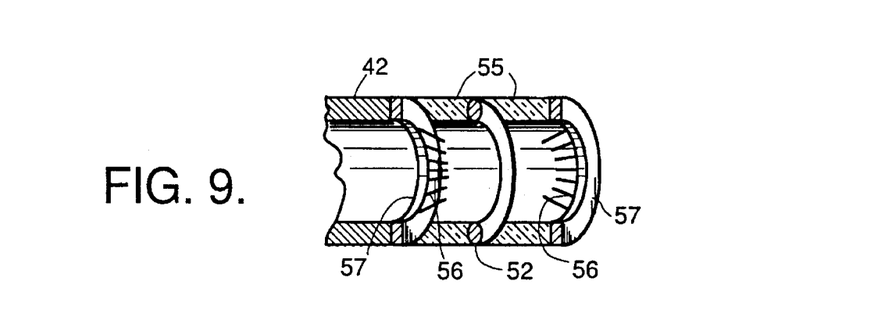
FIG. 9 is a fragmentary, sectioned perspective view of an anode/cathode assembly employed in FIG. 8.

A closed loop system for treating liquid waste is illustrated in FIG. 8. A pump 40 circulates the liquid around the closed conduit 42, with valves 44 and 46 providing fluid inlets and outlets, as desired. An optional high voltage power supply 48 or other voltage source provides a DC bias voltage that is modulated by an RF modulator 50, which is illustrated as being connected to provide an output signal to anode electrodes 52 and 54 on opposite sides of the conduit. The conduit sections 55 on either side of each anode are formed from a dielectric material, as illustrated in FIG. 9, to separate the anodes from the grounded metal pipe 42. A series of cathode electrode tines 56, the distal ends of which are distributed across the conduit's cross-section, extend into the conduit 42 from metal cathode rings 57 at the ends of the insulating sections 55. The cathode electrodes are typically grounded by connecting them to metallic portions of the conduit that run to and from the pump 40 and also to the RF modulator 50 and negative polarity side of the optional voltage source 48. The output RF modulator 50, together with an optional DC bias, is applied to the anode electrodes located within the two insulating conduit sections. It is not necessary that the anode be physically inside the insulating conduit and in contact with the liquid. The anode's function is to develop electric fields at the cathode electrodes. The liquid is circulated, with turbulent flow if necessary, until the desired level of treatment has been achieved.

Figure 10:
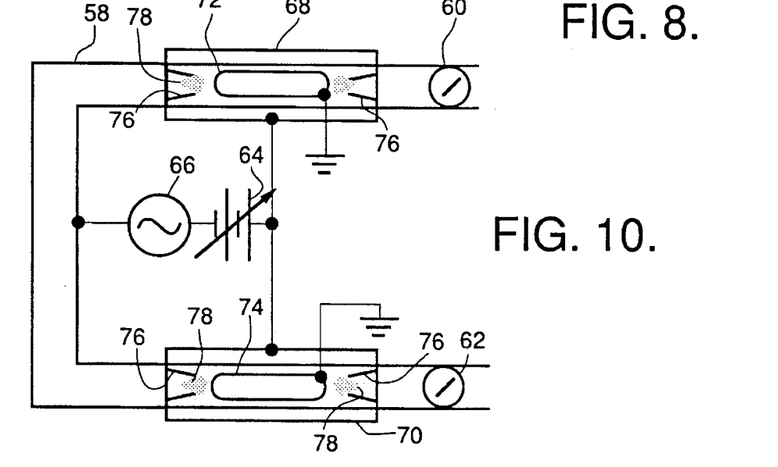
FIG. 10 is a simplified diagram of an open liquid waste treatment system that uses a third type of corona discharge mechanism.

An open loop system with another corona source configuration, in which the flow is regulated at a speed that achieves the necessary excitation and treatment in a single pass through four corona regions, is illustrated in FIG. 10. In this case an open-ended conduit 58 has input and outlet valves 60, 62 which control the flow of liquid through the conduit. An optional DC source 64, which is illustrated as being variable so that the corona discharge power can be controlled, biases the output from an RF modulator 66 which provides an RF output to anode electrode frames 68, 70 on opposite sides of the conduit. In this embodiment, separate grounded reference electrodes are provided within the conduit in the form of cylinders 72, 74 with rounded ends. A series of electrode tines 76 extend from each frame towards their respective ground electrodes, producing corona discharges 78 in the vicinity of the distal ends of the tines and the ground electrodes. With a proper positioning of the tines, substantially all of the flowing liquid can be treated by passing it sequentially through the four regions of corona discharge 78. Appropriate seals would be provided where the frames enter the conduit to prevent leaks.

It is important, for reasons of energy conservation, to avoid continuing the corona current flow beyond the point at which the corona streamers and brushes merge, or one or the other reaches the opposite electrode. This is because further current will lead to a concentration of the current into a resistively heated arc channel of very small cross section, and will not contribute to chemical excitation of the bulk of the remaining liquid. Based upon the work done with electron beam treatment, approximately 8 J/cc is required to treat typical contaminates.

In accordance with the invention, the duration of high electric fields is limited so that the motion of corona streamers or brushes is truncated before arcing begins. To accomplish this, pulses must be applied rapidly and then removed rapidly. The surface properties of the electrodes play a role in the onset of the corona. There is an advantage to providing a well defined structure with field enhancement at periodic or random locations to help reduce the necessary applied voltage. However, more uniform propagation and activation is achieved by using the maximum fields obtainable. Typically, fields well in excess of 100 kV/cm will ensure corona inception and a correspondingly rapid closure of the gap between electrodes.

Arcing in the gap is inhibited by adjusting the pulse shape, which also limits the required power. Limiting the required power is very important, in that if the required electrical power exceeds some maximum amount (for example, 50% of the engine power for automobile applications), the system will be deemed to be impractical by its users. For this purpose, the external power is reduced as the corona bridges the gap. The initial energy U that is stored in the capacitance Co of the gap is given by:

$$U = \tfrac{1}{2} C_o V_o^2$$

where $V_o$ is the initial voltage. A crude rule of thumb for propagation near the threshold for instability is that the charge remains a constant as the corona front moves. In this case, if the electrodes are first charged to the level $V_o$ and then disconnected from the power supply, the stored energy is just enough to supply a constant E field as the front sweeps across. The energy dissipated per unit length is then also a constant that is just equal to the initial energy density stored in the gap. At lower E fields the corona may die out, while at higher fields the front may accelerate and the charge build up. Alternately, providing power to the electrodes during the discharge leads to enhancement of the energy in the front, and a higher likelihood of arcing at an earlier time. Once a corona stream is initiated, the electric field at the discharge tip is enhanced by a field enhancement factor, thereby reducing the required average value of the E field.

One method for determining how much energy will lead to an arc involves measuring the minimum voltage for the onset of an arc. At this voltage level the formation of corona will be at a minimum, and the delay between the application of the voltage and the glow-to arc transition is highly unpredictable. It has been discovered empirically that, when the voltage is raised to twice the minimum arc voltage, the delay time between the application of the voltage and the onset of an arc falls to a minimum, and the statistics become much more stable. If it is desired to ensure corona inception, the voltage should exceed about twice the minimum threshold. However, to avoid putting excess power into an arc, the circuit should be timed to first reduce and then remove external power before the minimum time delay is reached.

To rapidly initiate a corona discharge, but still prevent arcing all the way between opposed electrodes, the pulses applied to the discharge electrode can have an initial high voltage level to initiate the corona streamers, rapidly followed by a reduction in voltage to prevent the streamers from crossing all the way between the electrodes to produce an arc. The net result is to sustain an efficient corona discharge for a longer period than would be the case if the initial high voltage were maintained. The reduction in voltage is rapidly followed by a negative voltage, which pulls energy back out of the electrode gap before an arc is reached. This type of pulse is indicated by reference number 80 in FIG. 11a, with an initial high positive voltage 80a followed by a lower positive voltage level 80b, and then a negative voltage 80c. By reversing the current flow to the electrodes during each pulse, energy losses consist mainly of current that is used for the actual formation of corona.

Figure 11A:
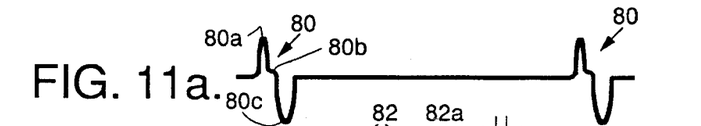
FIGS. 11a–11d are waveforms showing various types of AC pulses that can be used to excite an RF corona discharge.
Figures 11B, 11C:
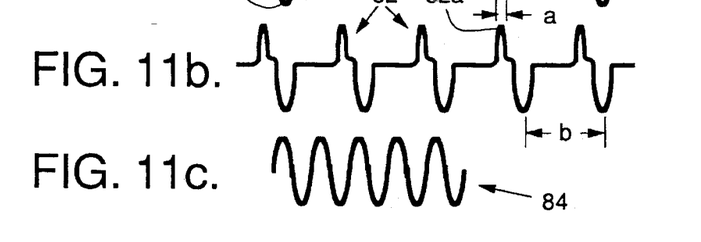

The pulses 80 in FIG. 11a are spaced fairly wide apart. If the pulses are moved closer together in time, as illustrated in FIG. 11b, a lower initial voltage can be employed because each pulse 82 is initiated while there is still some ionization from the previous pulse. This lower initial voltage results in a reduction in wasted energy. A relatively complex pulse forming network would be required to produce the pulses of FIG. 11a or 11b. Alternately, these pulses could be generated by taking their Fourier transform, and superimposing a range of RF signals which correspond to the transform. In this case the period "a" of the initial high voltage pulse 82a corresponds to the period of a single RF frequency at the high frequency end of this range, while the period "b" between successive pulses corresponds to the fundamental RF frequency.

Using RF signals rather than a switching circuit to produce the pulses makes it possible to obtain closer spaced pulses with a lower voltage. The lower voltage in turn provides a higher degree of control over the corona discharge, so that more corona power per unit volume can be sustained without arcing. Instead of the shaped pulses of FIG. 11a and 11b, an energizing signal at a single RF frequency can be used, as illustrated in FIG. 11c. The alternating positive and negative pulses of this signal 84 can be used to alternate the initiation of corona discharges from opposing electrodes. The pulse period is shorter than for the spaced pulses of FIGS. 11a and 11b, resulting in a reduction in wasted energy. Only a simple oscillator is needed to produce this waveform.

Figure 11D:
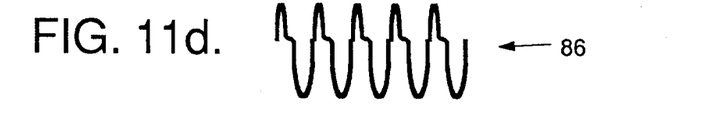

FIG. 11d illustrates a waveform 86 that can be produced by superimposing RF harmonic frequencies to yield a continuous series of shaped pulses, without any gaps between successive pulses. The individual pulse shapes are similar to those of FIGS. 11a and 11b, with initial peak positive voltages followed by a lower positive voltage, and then a negative portion. This type of waveform will generally require the lowest average voltage (although the initial peak may be higher than in the single frequency waveform of FIG. 11c), and consequently the lowest amount of wasted energy.

The optimum RF frequency for fluid waste treatment depends upon a number of factors. One is the nature of the medium, which effects the electron mobility and thus the propagation of corona streamers. Higher electron mobilities require higher frequencies to avoid arcing during a given period. Another factor is the density of the liquid, since the speed at which the ionization front moves varies in a positive fashion with the density. Accordingly, liquids with higher densities will require higher frequencies. A third factor is the operating voltage. Since the corona discharge will be established faster and propagate faster for higher voltages, the frequency should be increased as the voltage goes up. In general, operating frequencies for gaseous waste treatment will range from about 50 MHz to several hundred MHz, and for liquid waste treatment will range from several hundred MHz into the microwave band.

The optimum voltage also depends upon the particular application. The voltage level can be established empirically by turning on the power and adjusting the voltage until a corona discharge is observed which fills as much of the electrode gap voltage as possible, without arcing. The required voltage will generally increase as the gap spacing is enlarged. The voltage is also a function of the electrode shape. Pointed electrodes produce a high electric field, making it easier to form a corona discharge at a given voltage level. However, pointed electrodes tend to wear, and the corona discharge from a pointed electrode tends to be localized; operating a smooth electrode at a higher voltage will produce a more uniform corona. In any event, the actuating voltage can be kept to much less than 50 kV, considerably less than that required with the electron gun treatment technique, with the electrode selected to produce an electric field greater than 100 kV/cm to initiate the corona discharge. For the helical coil resonator described above, which employs a pointed electrode, the excitation voltage will generally be on the order of about 500–1,000 V in a gas and about 1500–3000 V in many liquids.

While it is normally desirable to alternate positive and negative pulses, unipolar pulses such as all-positive may also be employed by biasing the RF field with a DC voltage (48, 64). This is less energy efficient than an RF excitation, since the corona streamers must be made to lose their energy by the time they approach the opposite electrode. Otherwise, all of the energy put into the electrode gap is lost, without pulling any back as with pulses of alternating polarity. Since the stored energy varies with the square of the applied voltage, a negative pulse is particularly important if a high voltage is needed to initiate a corona discharge. However, the DC bias approach enables easier initiation of a discharge to start the corona, after which it may be reduced.

Figure 12A:
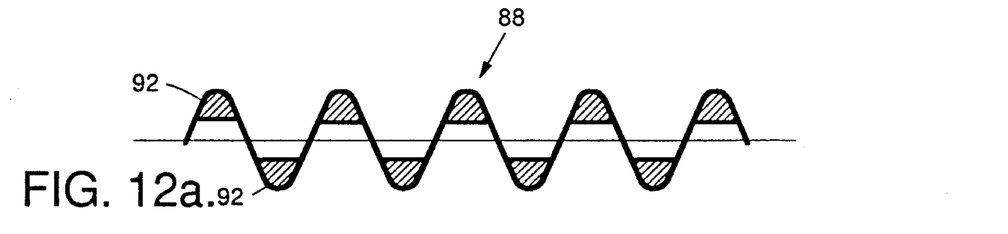
FIGS. 12a and 12b are waveforms comparing an AC with a progressively reduced DC RF energizing waveform.
Figure 12B:
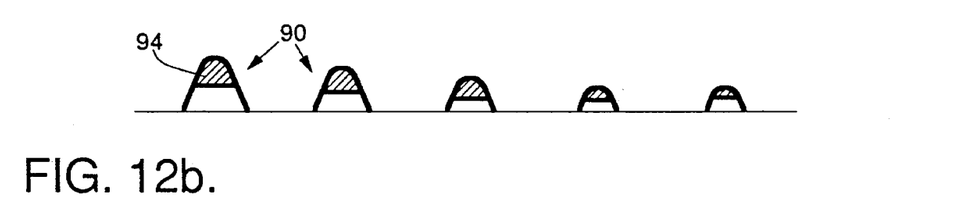

Although unipolar pulses generally involve a loss of energy efficiency as compared to an alternating RF signal, it is easier to implement a unipolar pulse forming circuit than one that alternates positive and negative pulses. FIGS. 12a and 12b compare the energy situation for a single-frequency RF signal 88 and a series of spaced positive pulses 90. In the RF signal 88, the energy that goes into the corona discharge is illustrated by shaded areas 92 around the peaks of alternating positive and negative pulses. This corona energy is equal for each successive period. With the DC biased pulses of FIG. 12b, by contrast, if the pulses are applied at a high enough frequency, each pulse will leave residual energy in the corona gap that will still be present when the next pulse arrives. Accordingly, subsequent pulses can have successively lower peak voltages, since less energy is needed for the successive discharges. This is illustrated by the successive reduction in pulse heights and corona energy 94 in FIG. 12b. The reduction in the average DC pulse voltage mitigates the lower efficiency of the unipolar approach.

Shaped pulses with an initial high voltage level, as illustrated in FIGS. 11a, 11b and 11d, can be generated either with high power RF oscillators or resonant RF circuits as described above, or with conventional pulse forming networks, Bleumleins, Marx banks, or more modern pulsers or laser activated switches. Generally, the use of a matched pulse forming network limits the voltage applied to the corona discharge electrode to one-half of the voltage applied to the pulse forming network. However, a Bleumlein that uses two pulse forming networks allows the full initial voltage to be applied.

Figure 13:
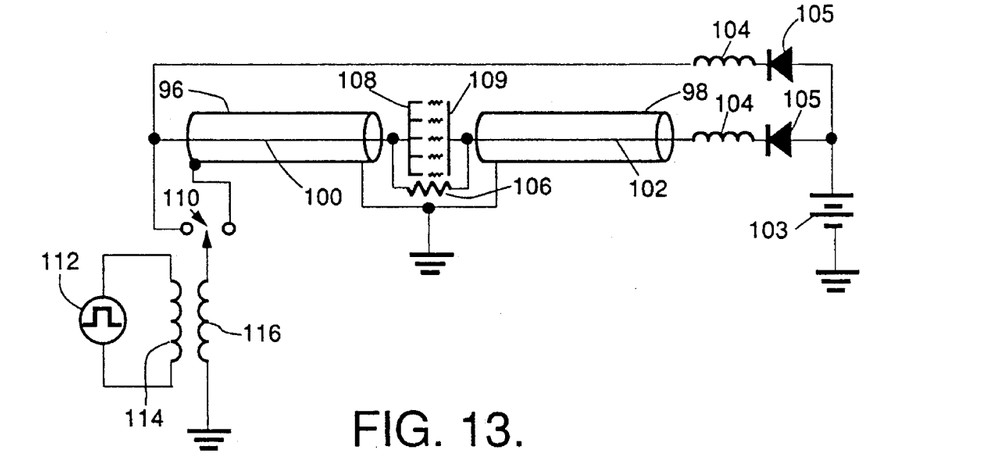
FIG. 13 is a simplified schematic diagram showing a modified Bleumlein circuit that can be used as a pulse forming network for the RF corona energizing signal.

This type of pulse forming device is illustrated in FIG. 13. A pair of pulse forming networks in the form of cable sections 96 and 98 surround respective inner conductors 100 and 102, and are energized at the opposite ends of cables 96 and 98 by a power supply 103 that is applied through a resonant charging network composed of inductors 104 and diodes 105. An impedance matching resistor 106 is connected between the inner conductors of the two cables. Corona discharge electrodes 108 and 109 are connected between the opposing sides of cable conductors 100 and 102. Pulses are applied to the electrodes at a periodic rate by periodically triggering a spark gap 110 between the outside end of cable 96 and ground. The trigger circuit consists of a trigger pulse generator 112 that is connected to a low transformer winding 114, with a high voltage winding 116 coupled to the low voltage winding so as to trigger the spark gap when a trigger pulse is applied. The cable lengths and trigger pulse rate are selected to resonantly charge the cable transmission lines, which generate high voltage corona pulses at resonance.

Figure 14:
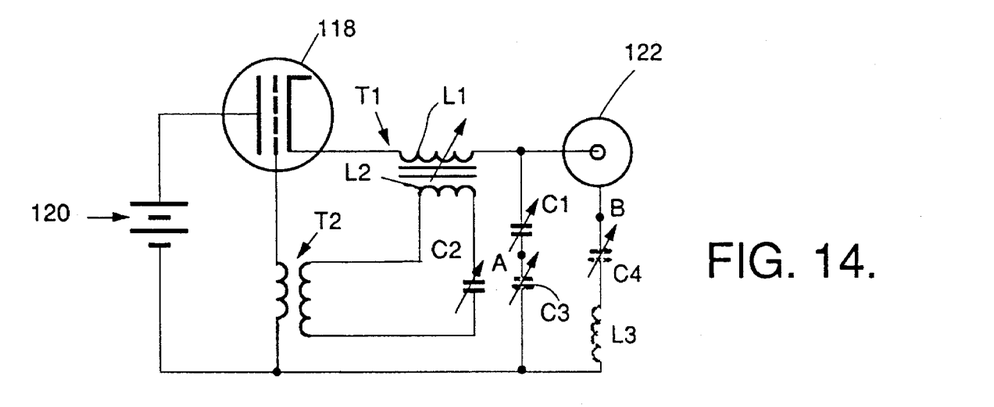
FIG. 14 is a simplified schematic diagram of an improved pulse forming circuit.

A more efficient pulse forming circuit is shown in FIG. 14. It employs an RF switch tube 118 between a DC power supply 120 and the corona chamber 122. The RF switch tube 118 is typically a vacuum tube capable of switching on and off at the repetition rate (such as 100 MHz) required at the power levels noted above. A resonant inductor L1 and a capacitor C1 are added as required to compensate for variations in lead inductance and load capacitance to tune the circuit to resonate at the desired frequency. A resonant feedback loop is used to sense oscillating current in the load, phase shift it with a capacitor C2, and drive the grid potential of the switch tube 118 at an optimum phase delay. In one implementation of the circuit, the feedback is sensed by making L1 the primary winding of a resonant transformer T1, with the secondary winding L2 connected in a loop with C2 and the primary winding of a pickup transformer T2; the secondary winding of T2 is connected back to the grid of switch tube 118. Numerous other feedback options are also available, such as a capacitive pickup at point A using an additional capacitor C3, or a pickup at point B using an optional capacitive C4 or an inductor L3 to generate a voltage of a desirable level and phase.

The present invention thus provides both an improved corona discharge source, and a corona-based fluid waste treatment technique that avoids the high voltages required by electron beam treatment, the high cost of thermal treatment, the limited utility of UV treatment and the safety, handling and undesirable byproduct problems of chemical treatment. While several illustrative embodiments of the invention have been shown and described, numerous variations and alternative embodiments will occur to those skilled in the art. Such variations and alternate embodiments are contemplated, and can be made without departing from the spirit and scope of the invention as defined in the appended claims.

We claim:

1. A method of producing a corona discharge, comprising:

conducting a radio frequency (RF) signal along a helical path that is self-resonant at the RF signal frequency, fixing said RF signal at a substantially constant reference voltage level at a first location in said path, providing a corona discharge site for said RF signal at a second location in said path that is spaced from said first location and at which the difference between the value of said RF signal and said reference voltage level is substantially maximum relative to said difference at all other locations in said path, and inducing a corona discharge from said discharge site by applying said RF signal to said first path location.

2. The method of claim 1, wherein said first and second locations are at opposite ends of the helical path.

3. The method of claim 2, wherein said RF signal is selected to produce a resonance between said opposite ends of the helical path.

4. The method of claim 3, wherein said helical path extends axially for approximately ¼ the axial wavelength of said RF signal along the helical path.

5. A method of activating a chemical reaction to remove organic molecules from a liquid that includes water, comprising:

initiating a corona discharge within said liquid to generate reactive OH radicals from said water, and sustaining said corona discharge at a level and for a duration sufficient for said OH radicals to react with and break down at least a portion of said organic molecules.

6. The method of claim 5, wherein said corona is initiated and sustained by applying radio frequency (RF) actuating pulses to a discharge electrode with said liquid.

7. The method of claim 6, wherein said pulses have alternating positive and negative components to alternately initiate a corona discharge at an arcing potential, and to draw corona energy out from said corona discharge before arcing occurs.

8. The method of claim 7, wherein the positive components of said pulses have high initial voltages to initiate said corona discharge, followed by lower voltages to sustain the discharge.

9. The method of claim 7, wherein said pulses are applied at a single RF frequency.

10. The method of claim 7, wherein said pulses are formed with non-sinusoidal pulse shapes.

11. The method of claim 7, wherein the positive components of said pulses have a voltage less than 50 kV, and establish an electric field greater than 100 kV/cm to initiate said corona discharge.

12. The method of claim 6, wherein said pulses are unipolar.

13. The method of claim 12, wherein said pulses are temporarily separated by time gaps to establish a residual corona energy from one pulse to the next, and the voltages of at least a portion of said pulses are progressively reduced following an initial pulse.

14. A method of initiating and sustaining a corona discharge to remove organic molecules from a liquid that includes water, comprising:

conducting a radio frequency (RF) signal along a path that is self-resonant at the RF signal frequency, fixing said RF signal at a substantially constant reference voltage level at a first location in said path, providing a corona discharge site for said RF signal within said liquid at a second location in said path that is spaced from said first location and at which the difference between the value of said RF signal and said reference voltage level is substantially maximum relative to said difference at all other locations in said path, inducing a series of corona discharges within the liquid from said discharge site by applying said RF signal to said first path location to generate highly reactive OH radicals from said water, and sustaining said corona discharges at levels and for durations sufficient for said OH radicals to react with and break down at least a portion of said organic molecules.

15. The method of claim 14, wherein said RF signal is selected to produce a resonance between said opposite ends of the path.

16. The method of claim 15, wherein said length contracted path comprises a helical path that extends axially for approximately ¼ the axial wavelength of said RF signal along said helical path.

* * * * *